US012705585B2

(12) United States Patent
Lawrence et al.

(10) Patent No.: US 12,705,585 B2
(45) Date of Patent: Aug. 11, 2026

(54) VIRTUAL SUBACCOUNTS

(71) Applicant: MX Technologies, Inc., Lehi, UT (US)

(72) Inventors: Denna Lawrence, Lehi, UT (US); Justin Martin, Cottonwood Heights, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 26 days.

(21) Appl. No.: 17/390,957

(22) Filed: Jul. 31, 2021

(65) Prior Publication Data

US 2021/0357889 A1 Nov. 18, 2021

Related U.S. Application Data

(63) Continuation of application No. 16/575,355, filed on Sep. 18, 2019, now abandoned.

(Continued)

(51) Int. Cl.
*G06Q 20/10* (2012.01)
*G06Q 10/40* (2026.01)

(Continued)

(52) U.S. Cl.
CPC ........... *G06Q 20/108* (2013.01); *G06Q 10/40* (2026.01); *G06Q 20/0655* (2013.01);

(Continued)

(58) Field of Classification Search
CPC ............ G06Q 20/108; G06Q 20/0655; G06Q 20/3221; G06Q 20/3223; G06Q 20/351;

(Continued)

(56) References Cited

U.S. PATENT DOCUMENTS 8,069,113 B2 * 11/2011 Elterich ............... G06Q 20/102 705/35
9,940,669 B2 * 4/2018 Caldwell ............ G06Q 30/0226

(Continued)

FOREIGN PATENT DOCUMENTS

JP 2017058905 A 3/2017
JP 20180109837 A 7/2018

(Continued)

OTHER PUBLICATIONS

Eesr, European Patent Office, Patent Application No. 19861990.0 "Search Report", Jul. 19, 2021, pp. 1-8.

(Continued)

*Primary Examiner* — Steven G.S. Sanghera
*Assistant Examiner* — Pierre L Maccagno
(74) *Attorney, Agent, or Firm* — KNH LLP

(57) ABSTRACT

Apparatuses, systems, methods, and computer program products are disclosed for virtual sub accounts. An apparatus includes an actual account module that receives information for an actual user account at a financial institution. An apparatus includes a virtual account module that creates a virtual account that comprises a simulated user account at a financial institution that is managed by an actual user account. An apparatus includes a linking module that links a virtual account to an actual user account so that the actual user account manages the virtual account.

20 Claims, 7 Drawing Sheets

Related U.S. Application Data

(60) Provisional application No. 62/732,579, filed on Sep. 18, 2018.

(51) Int. Cl.
*G06Q 20/06* (2012.01)
*G06Q 20/32* (2012.01)
*G06Q 20/34* (2012.01)
*G06Q 20/36* (2012.01)
*G06Q 20/40* (2012.01)
*G06Q 20/42* (2012.01)

(52) U.S. Cl.
CPC ..... *G06Q 20/3221* (2013.01); *G06Q 20/3223* (2013.01); *G06Q 20/351* (2013.01); *G06Q 20/36* (2013.01); *G06Q 20/405* (2013.01); *G06Q 20/42* (2013.01)

(58) Field of Classification Search
CPC ...... G06Q 20/36; G06Q 20/405; G06Q 20/42; G06Q 50/01
See application file for complete search history.

(56) References Cited

U.S. PATENT DOCUMENTS 10,510,082 B1 * 12/2019 Zimmerman ........ G06Q 20/108
11,321,697 B1 * 5/2022 MacDonald ....... G06Q 20/2295
2006/0178968 A1 * 8/2006 Jung ...................... G06Q 40/00 705/35
2006/0178985 A1 * 8/2006 Jung ...................... G06Q 40/03 705/39
2006/0195377 A1 * 8/2006 Jung ...................... G06Q 30/02 705/35
2006/0195378 A1 * 8/2006 Jung ...................... G06Q 40/02 705/35
2006/0195394 A1 * 8/2006 Jung ...................... G06Q 30/04 705/39
2006/0229976 A1 * 10/2006 Jung ...................... G06Q 20/10 705/39
2007/0038559 A1 * 2/2007 Jung ...................... G06Q 90/00 715/745
2008/0109338 A1 * 5/2008 Jung ...................... G06Q 40/02 463/25
2008/0167965 A1 * 7/2008 Von Nothaus ......... G06Q 20/20 705/16
2008/0177650 A1 * 7/2008 Jung ...................... G06Q 30/06 463/25
2008/0228615 A1 * 9/2008 Scipioni ............... G06Q 20/105 705/35
2008/0228637 A1 * 9/2008 Scipioni ................. G06Q 40/12 705/35
2008/0228638 A1 * 9/2008 Scipioni ................. G06Q 20/10 705/39
2009/0106158 A1 * 4/2009 Hill ...................... G06Q 20/105 705/41
2011/0093351 A1 * 4/2011 Afana .................... G06Q 20/40 705/16
2012/0123924 A1 5/2012 Rose et al.
2012/0209749 A1 8/2012 Hammad et al.
2012/0215688 A1 8/2012 Musser et al.
2014/0129442 A1 * 5/2014 Hanson .............. G06Q 20/3221 705/44
2015/0088707 A1 * 3/2015 Drury .................. G06Q 40/128 705/30
2016/0162882 A1 6/2016 Mcclung, III
2016/0171503 A1 6/2016 Nelsen
2017/0004465 A1 * 1/2017 Balasubramanian ........................ G06Q 20/023
2017/0011398 A1 * 1/2017 Narasimhan ......... G06Q 20/108
2019/0080309 A1 * 3/2019 Goodwin ............. G06Q 20/229
2019/0114575 A1 * 4/2019 Gahnoog ............... G06N 20/00
2019/0182233 A1 * 6/2019 Hockey ............... H04L 63/0807
2019/0318122 A1 * 10/2019 Hockey ............... G06F 21/6245
2020/0007554 A1 * 1/2020 Vincent ............... G06F 21/6218
2020/0090148 A1 * 3/2020 Lawrence ............. G06Q 10/40
2021/0357889 A1 11/2021 Lawrence et al.

FOREIGN PATENT DOCUMENTS

WO WO-2005059795 A1 * 6/2005 ........... G06Q 20/405
WO WO-2009046381 A2 * 4/2009 ............. G06Q 40/00
WO 2020061239 A1 3/2020

OTHER PUBLICATIONS

AU Patent Application No. 2019345046 "Examination Report #1", Jan. 25, 2022, pp. 1-3.
CA Patent Application No. 3,082,339 "Office Action", Mar. 3, 2022, pp. 1-4.
IN Patent Application No. 202017019660 "Examination Report", Jun. 23, 2021, pp. 1-6.
JP Patent Application No. 2020529487 "Office Action—Notice of Reason for Rejection", May 17, 2022, pp. 1-5.
USPTO, U.S. Appl. No. 16/575,355 "Office Action", filed Aug. 27, 2021, pp. 1-20.
USPTO, U.S. Appl. No. 16/575,355 "Office Action", filed Sep. 19, 2022, pp. 1-30.
USPTO, U.S. Appl. No. 16/575,355 "Final Office Action", filed Jan. 6, 2022, pp. 1-32.
AU Patent Application No. 2019345046 Examination Report #2, Oct. 12, 2022, pp. 1-4.
CA Patent Application No. 3,082,339 "Office Action", Jan. 27, 2023.
CA Patent Application No. 3,082,339 "Office Action", Nov. 7, 2023.
USPTO, U.S. Appl. No. 16/575,355 "Final Office Action", filed Apr. 28, 2023.
USPTO, U.S. Appl. No. 16/575,355 "Office Action", filed Aug. 30, 2023.

* cited by examiner

VIRTUAL SUBACCOUNTS

CROSS-REFERENCES TO RELATED APPLICATIONS

This application is a continuation of U.S. patent application Ser. No. 16/575,355 entitled "VIRTUAL SUBACCOUNTS" and filed on Sep. 18, 2019, for Denna Lawrence et al., which claims the benefit of U.S. Provisional Patent Application No. 62/732,579 entitled "VIRTUAL ACCOUNTS BASED ON AGE GROUPS" and filed on Sep. 18, 2018, for Denna Lawrence, which is incorporated herein by reference.

FIELD

This invention relates to account management and more particularly relates to creating virtual subaccounts for an actual user account.

BACKGROUND

Some institutions may not allow users to have accounts until they are of a certain age or some users may not want to create an account at an institution, e.g., due to unfamiliarity or inexperience with the institution or its services. Virtual accounts, however, may be created to allow users to experience an institution's services without having an actual user account.

SUMMARY

Apparatuses, systems, methods, and computer program products are disclosed for virtual subaccounts. In one embodiment, an apparatus includes an actual account module that receives information for an actual user account at a financial institution. In further embodiments, an apparatus includes a virtual account module that creates a virtual account that comprises a simulated user account at a financial institution that is managed by an actual user account. In various embodiments, an apparatus includes a linking module that links a virtual account to an actual user account so that the actual user account manages the virtual account.

A method, in one embodiment, includes receiving information for an actual user account at a financial institution. A method, in further embodiments, includes creating a virtual account that comprises a simulated user account at a financial institution that is managed by an actual user account. A method, in some embodiments, includes linking a virtual account to an actual user account so that the actual user account manages the virtual account.

In one embodiment, an apparatus includes means for receiving information for an actual user account at a financial institution. In further embodiments, an apparatus includes means for creating a virtual account that comprises a simulated user account at a financial institution that is managed by an actual user account. In various embodiments, an apparatus includes means for linking a virtual account to an actual user account so that the actual user account manages the virtual account.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
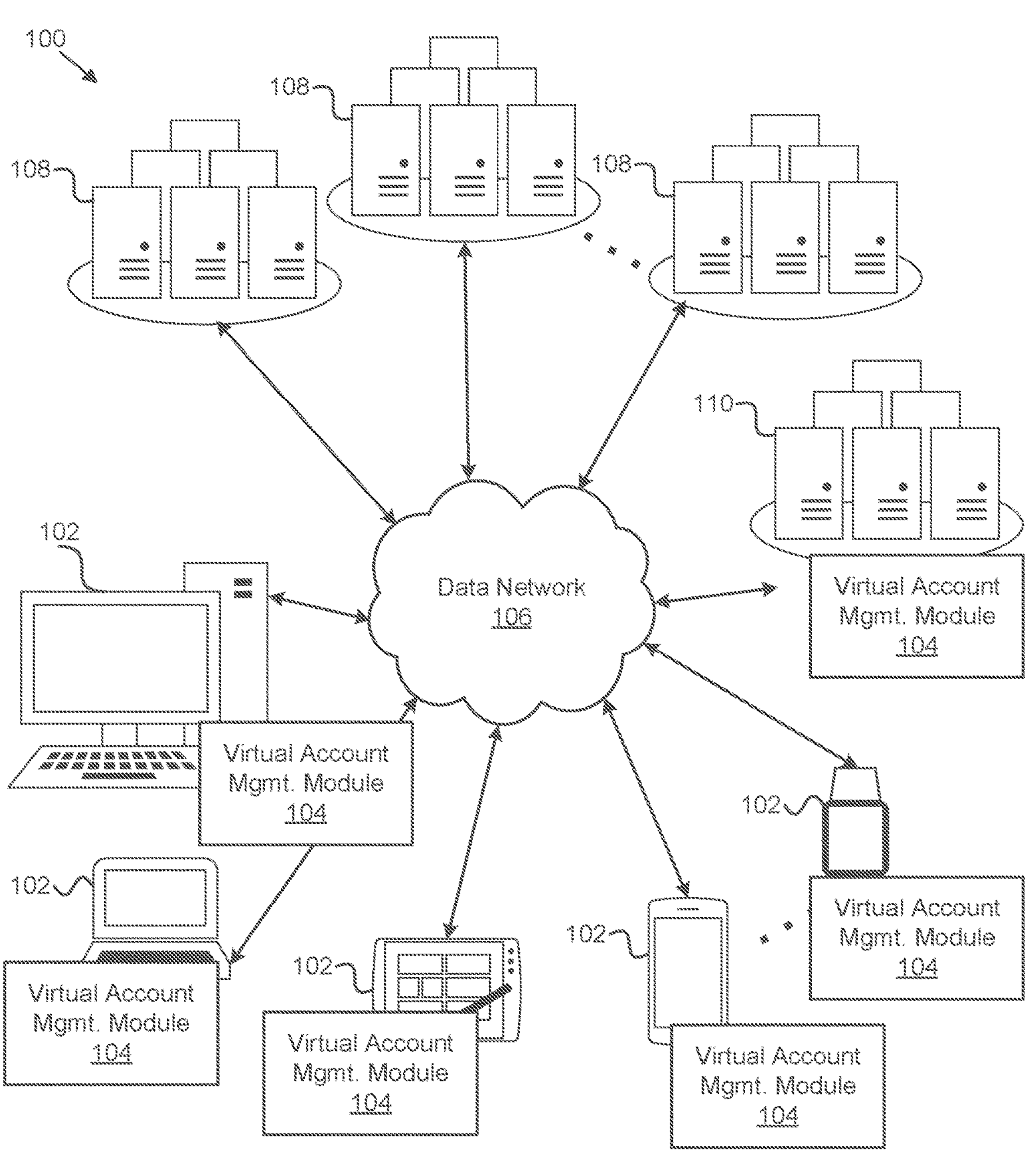
FIG. 1 is a schematic block diagram illustrating one embodiment of a system for virtual subaccounts.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for automated enterprise transaction data aggregation and accounting. In one embodiment, the system 100 includes one or more hardware devices 102, one or more virtual account management modules 104 (e.g., a backend virtual account management module 104*b* and/or a plurality of virtual account management modules 104*a* disposed on the one or more hardware devices 102), one or more data networks 106 or other communication channels, one or more third-party service providers 108 (e.g., one or more servers 108 of one or more service providers 108; one or more cloud or network service providers, or the like), and/or one or more backend servers 110. In certain embodiments, even though a specific number of hardware devices 102, virtual account management modules 104, data networks 106, third-party service providers 108, and/or backend servers 110 are depicted in FIG. 1, one of skill in the art will recognize, in light of this disclosure, that any number of hardware devices 102, virtual account management modules 104, data networks 106, third-party service providers 108, and/or backend servers 110 may be included in the system 100 for distributed data aggregation.

In one embodiment, the system 100 includes one or more hardware devices 102. The hardware devices 102 (e.g., computing devices, information handling devices, or the like) may include one or more of a desktop computer, a laptop computer, a mobile device, a tablet computer, a smart phone, a set-top box, a gaming console, a smart TV, a smart watch, a fitness band, an optical head-mounted display (e.g., a virtual reality headset, smart glasses, or the like), an HDMI or other electronic display dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the hardware devices 102 are in communication with one or more servers 108 of one or more third-party service providers 108 and/or one or more backend servers 110 via a data network 106, described below. The hardware devices 102, in a further embodiment, are capable of executing various programs, program code, applications, instructions, functions, or the like.

In one embodiment, a virtual account management module 104 is configured to receive information for an actual user account at a financial institution, create a virtual account that is a simulated user account at the financial institution that is managed by an actual user account, and link the virtual account to the actual user account so that the actual user account manages the virtual account. Various embodiments of a virtual account management module 104 and corresponding sub modules are discussed in more detail below with reference to FIGS. 2 and 3.

In certain embodiments, a virtual account management module 104 may present a variable user interface (UI) to a user depending on an age of the user logging in. For example, the age ranges of 3-5 years, 6-8 years, 9-12 years, 13-17 years, 18-24 years, or the like, may have different user interfaces. A different UI of a virtual account management module 104 may include a different look, different functions (e.g., not relying on reading skills for younger groups, supporting different gesture interactions for different age groups, or the like), and/or one or more other differences. For example, younger children may not be able to double-tap easily, but may be able to swipe, single-tap, drag, or the like. In some embodiments, a virtual account management module 104 may automatically and/or dynamically adjust and/or change one or more user interface elements for a user based on the user's usage history of the user interface (e.g., providing more advanced user interface elements and/or functions as a user's interactions with the user interface become more advanced, or the like).

In certain embodiments, (e.g., if a financial institution does not allow children under 13 to have a real/actual financial account), a virtual account management module 104 may provide a virtual account for the child within a real/actual account of an adult user (e.g., a parent or guardian). A virtual account management module 104, in one embodiment, may convert a virtual account to a real account in response to the child being old enough (e.g., allowed) to obtain a real/actual account through a financial institution (e.g., a third-party service provider 108, or the like). A virtual account management module 104 may provide a seamless experience in the UI of a hardware device 102 to convert a virtual account to a real/actual account. In a further embodiment, a financial institution 108 or other third-party service provider 108 may convert a "youth account" to an "adult account" or the like in response to a child turning 18 years old, and may also provide a seamless experience (e.g., in a mobile application or the like executing on a hardware computing device 102). This may help to retain customers at the financial institution 108.

Parents, guardians, and/or other adult users, in certain embodiments, may provide one or more chores for one or more children to do (e.g., for a cash deposit into a child virtual account) using an interface of a virtual account management module 104. Parents, guardians, and/or other adult users, in some embodiments, may also schedule a recurring allowance that will deposit money into a child's virtual account automatically, and/or parents may perform one-time payments into a child's virtual account, using an interface of a virtual account management module 104. In one embodiment, parents, guardians, and/or other adult users may setup, using an interface of a virtual account management module 104, an "interest" payment to help children learn the value of saving money in their virtual accounts.

In certain embodiments, a virtual account management module 104 may provide an interface for a child to provide an idea they would like to perform for money (e.g., fill out a "request" or the like) which the virtual account management module 104 may sent to a parent, guardian, and/or other designated adult user, who may reject, approve, and/or suggest a modification to the request (e.g., negotiating for price and/or requirements of a request, or the like). A child, in some embodiments, may fill out a request to purchase an item, if they do not have or are too young for a debit card where they can buy things for themselves. A parent, guardian, and/or another adult user, in certain embodiment, may also fill out a request for a child to pay or earn money, such as if the child breaks something and they need to pay it back, if the child performs a chore and earns money, if the child wants to take out a "loan" from the parent, or the like.

A child or other user, in certain embodiments, may use an interface of a virtual account management module 104, to set one or more goals, allocate money toward one or more goals, or the like. In one embodiment, a virtual account management module 104 may provide an interface for a child to link and/or otherwise associate one or more transactions to a goal (e.g., to indicate that the child has totally or partially "cashed out" their goal when making that purchase, or the like). For example, a child may save $200 for school clothes, and then when they go shopping, they may indicate, using an interface of a virtual account management module 104, that a transaction (e.g., this shoe transaction, this pants transaction, or the like), goes toward fulfilling and/or "cashing out" that goal.

In certain embodiments, a virtual account management module 104 may be configured to educate a child or other user, such as introducing a child to cumulative interest, credit cards, investments, or the like. Educational experience provided by a virtual account management module 104, in some embodiments, may occur dynamically as a user (e.g., a child) interacts with the user interface (e.g., in response to real-life situations). For example, a virtual account management module 104 may provide educational content regarding saving and/or investing in response to a child or other user receiving an allowance and/or other payment, may provide educational content regarding taxes in response to a tax payment, may provide educational content regarding charitable donations in geographic proximity to a donation location (e.g., based on a geographical location determined based on GPS or other location sensors of a user's hardware device 102, or the like), may provide educational content regarding budgeting based on a child or other user's actual transaction history and/or based on a projected shortfall and/or negative balance, and/or based on other actual events detected by the virtual account management module 104 in a user's virtual account interface interactions and/or financial transaction data.

In certain embodiments, the system 100 includes a plurality of virtual account management modules 104 disposed/located on hardware devices 102 of a plurality of different users (e.g., comprising hardware of and/or executable code running on one or more hardware devices 102). The plurality of virtual account management modules 104 may act as a distributed and/or decentralized system 100, executing across multiple hardware devices 102, which are geographically dispersed and using different IP addresses, each downloading and/or aggregating data (e.g., photos, social media posts, medical records, financial transaction records, other financial data, and/or other user data) separately, in a distributed and/or decentralized manner. In other embodiments, a plurality of virtual account management modules 104 may function in a centralized and/or client-server arrangement.

In one embodiment, a hardware device 102 may include and/or execute an internet browser, which a user may use to access a server 108 of a third-party service provider 108 (e.g., by loading a webpage of the third-party service provider 108 in the internet browser). At least a portion of a virtual account management module 104, in certain embodiments, may comprise a plugin to and/or an extension of an internet browser of a user's personal hardware device 102. For example, the virtual account management module 104 may use the same cookies, IP address, saved credentials, or the like as a user would when accessing a server 108 of a third-party service provider 108 through the internet browser. In certain embodiments, the virtual account management module 104 may support integration with multiple different types of internet browsers (e.g., on different hardware devices 102).

In one embodiment, at least a portion of a virtual account management module 104 may be integrated with or otherwise part of another application executing on a hardware device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like) which may use data the virtual account management module 104 downloads from a server 108 of a third-party service provider 108.

In various embodiments, a virtual account management module 104 may be embodied as hardware, software, or some combination of hardware and software. In one embodiment, a virtual account management module 104 may comprise executable program code stored on a non-transitory computer readable storage medium for execution on a processor of a hardware device 102, a backend server 110, or the like. For example, a virtual account management module 104 may be embodied as executable program code executing on one or more of a hardware device 102, a backend server 110, a combination of one or more of the foregoing, or the like. In such an embodiment, the various modules that perform the operations of a virtual account management module 104, as described below, may be located on a hardware device 102, a backend server 110, a combination of the two, and/or the like.

In various embodiments, a virtual account management module 104 may be embodied as a hardware appliance that can be installed or deployed on a backend server 110, on a user's hardware device 102 (e.g., a dongle, a protective case for a phone 102 or tablet 102 that includes one or more semiconductor integrated circuit devices within the case in communication with the phone 102 or tablet 102 wirelessly and/or over a data port such as USB or a proprietary communications port, or another peripheral device), or elsewhere on the data network 106 and/or collocated with a user's hardware device 102. In certain embodiments, a virtual account management module 104 may comprise a hardware device such as a secure hardware dongle or other hardware appliance device (e.g., a set-top box, a network appliance, or the like) that attaches to another hardware device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like); that operates substantially independently on a data network 106; or the like. A hardware appliance of a virtual account management module 104 may comprise a power interface, a wired and/or wireless network interface, a graphical interface (e.g., a graphics card and/or GPU with one or more display ports) that outputs to a display device, and/or a semiconductor integrated circuit device as described below, configured to perform the functions described herein with regard to a virtual account management module 104.

A virtual account management module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a virtual account management module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a virtual account management module 104.

The semiconductor integrated circuit device or other hardware appliance of a virtual account management module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a virtual account management module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third-party service providers 108, in one embodiment, may include one or more network accessible computing systems such as one or more web servers hosting one or more web sites, an enterprise intranet system, an application server, an application programming interface (API) server, an authentication server, or the like. The one or more third-party service providers 108 may include systems related to various institutions or organizations. For example, a third-party service provider 108 may include a system providing electronic access to a financial institution, a university, a government agency, a utility company, an email provider, a social media site, an online merchant site, a data storage site, a medical provider, or another entity that stores data associated with a user. A third-party service provider 108 may allow users to create user accounts to upload, view, create, and/or modify data associated with the user. Accordingly, a third-party service provider 108 may include an authorization system, such as a login element or page of a web site, application, or similar front-end, where a user can provide credentials, such as a username/password combination, to access the user's data.

In one embodiment, the one or more backend servers 110 and/or one or more backend virtual account management modules 104 provide central management of the networked swarm of virtual account management modules 104. For example, the one or more backend virtual account management modules 104 and/or a backend server 110 may store downloaded user data from the virtual account management modules 104 centrally, may provide instructions for the virtual account management modules 104 to access user data from one or more third-party service providers 108 using user credentials, or the like. A backend server 110 may include one or more servers located remotely from the hardware devices 102 and/or the one or more third-party service providers 108. A backend server 110 may include at least a portion of the modules or sub-modules described below with regard to the virtual account management modules 104 of FIG. 2 and FIG. 3, may comprise hardware of a virtual account management module 104, may store executable program code of a virtual account management module 104 in one or more non-transitory computer readable storage media, and/or may otherwise perform one or more of the various operations of a virtual account management module 104 described herein.

Figure 2:
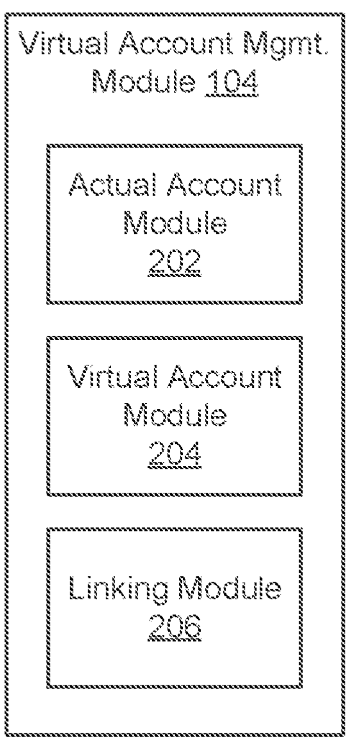
FIG. 2 is a schematic block diagram of one embodiment of a virtual account management module.

FIG. 2 depicts one embodiment of a virtual account management module 104. In the depicted embodiment, the virtual account management module 104 includes an actual account module 202, a virtual account module 204, and a linking module 206, which are described in more detail below.

In one embodiment, the actual account module 202 is configured to receive information for an actual user account. The actual user account may be associated with, held at, located at, or otherwise maintained or managed by a financial institution such as a bank, credit union, online bank, investment bank, hedge fund, wealth management company, financial broker, or the like. Other actual user accounts may be associated with digital content, health information, online retail accounts, and/or the like. As used herein, an actual user account refers to an actual, real, primary, base, host, working, or active user account that is managed or maintained by an institution. For instance, an actual user account for a financial institution may comprise a savings account, a checking account, a deposit account, an online account, a spending account, a retirement account, a credit card account, a line of credit account, and/or the like that a person can actively use to make actual or actual transactions, such as withdrawing and depositing money, which causes actual-world, actual changes to the account (e.g., causes the account's balance to increase or decrease, causes the user's credit to change, and/or the like).

In certain embodiments, the actual account module 202 receives identification information for an actual user account such as an account number or other account identifier, information about the institution associated with the account (e.g., a bank's address, routing number, or the like), user credential information for the account, transaction information for the account (e.g., a transaction history for the account), balance information for the account, and/or the like).

The virtual account module 204, in one embodiment, is configured to create a virtual account at the institution associated with the actual user account, e.g., a bank or other financial institution. The virtual account, as used herein, refers to a simulated user account that is managed, controlled, supervised, linked to, maintained, or the like by the actual user account. The virtual account may be a subaccount of an actual account. The virtual account module 204 may generate different types of virtual accounts such as virtual savings accounts, virtual checking accounts, virtual credit card accounts, virtual loan accounts, and/or the like. The virtual account module 204 may create virtual account numbers, virtual credit card numbers, virtual loan numbers, or other identifiers for identifying a virtual account.

In certain embodiments, the virtual account module 204 creates a virtual account that has the same features, elements, specifications, attributes, and/or the like of a corresponding or similar actual user account. For example, the virtual account module 204 may create a virtual checking account that mimics the same features, benefits, or other characteristics of an actual checking account (e.g., same interest rate, same account number format, or the like). Thus, a virtual account is designed to mimic a counterpart actual account in many, if not all, respects, to provide for simulated use of an actual user account for experimentation, educational use, budgeting, testing, and/or the like.

In one embodiment, the linking module 206 links a virtual account to an actual user account so that the actual user account manages, controls, supervises, maintains, or the like the virtual account. For instance, the linking module 206 may maintain a list, database, data store, mapping, or the like of actual user accounts that are linked to a virtual account by account number or another identifier. In certain embodiments, the linking module 206 may link multiple actual user accounts to a virtual account. For example, a virtual bank savings account may be linked to a savings account at Bank 1, a checking account at Bank 2, and a savings account at Bank 3. The linking may be managed by a financial institution, by a financial aggregator service, or another third-party using APIs or other communication and interoperability interfaces.

In certain embodiments, when a virtual account is linked to an actual user account, transactions that are performed using the virtual account can be processed using the actual user account. For example, a parent may want their child to become familiar with money and financial management and may use the virtual account management module 104 to set up a virtual account for their child that is linked to the parent's actual checking account. The parent may then "transfer" funds to the child's virtual account, which will be recognized in the virtual account, but the funds stay in the parent's actual checking account because the child's virtual account is not an actual user account at the bank. When funds are "transferred" from the parent's user account to the child's virtual account, the "transferred" funds are no longer recognized in the parent's available balance because they have been marked, flagged, or the like as "transferred" or otherwise provided to the child's virtual account.

In other words, the "transferred" funds are not in reality transferred to the child's virtual account but are marked as belonging to the child's virtual account so that they are not available for other transactions using the parent's user account. Thus, when transactions are processed using the child's virtual account, e.g., if the child buys something online using the virtual account, the transaction will be processed using funds in the parent's account that are marked or flagged as belonging to the child's virtual account, and both the child's virtual account balance and the balance of the funds in the parent account that are flagged for the child's virtual account. In this manner, a user can learn and become familiar with online banking and using a financial account such as a savings account, checking account, a credit card, a loan, or the like as if the user were using an actual financial account in a supervised manner with little to no risk.

In certain embodiments, when the actual user account and the virtual account are linked, the interface for the actual user account will display information about the virtual account that is linked to the actual user account, including the virtual account balance, different goals and tasks associated with the virtual account, a transaction history of the virtual account, and/or the like.

In some embodiments, virtual accounts may be used to simulate different currencies, e.g., classroom currencies for school economy simulations. In such an embodiment, the actual user account may be a temporary account set up by a school or other organization that works closely with a bank, for example, and allows each child to a have a virtual account that can be used throughout the school year to purchase items in the school, transfer "money" between students, award points/"money" for good performance/behavior, and/or the like. In this manner, students get simulated real-world experience with financial accounts and financial management.

Figure 3:
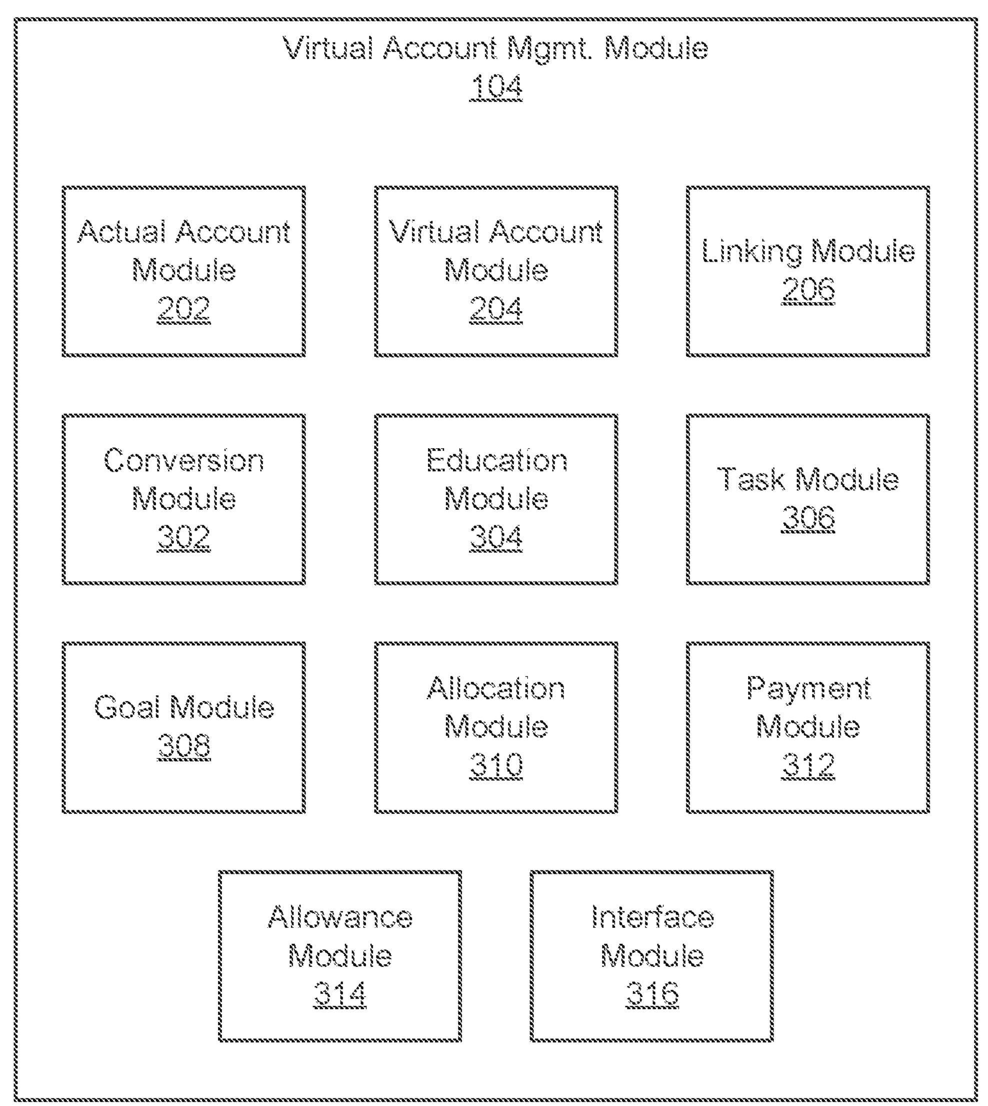
FIG. 3 is a schematic block diagram of another embodiment of a virtual account management module.

FIG. 3 depicts another embodiment of a virtual account management module 104. In the depicted embodiment, the virtual account management module 104 includes an actual account module 202, a virtual account module 204, and a linking module 206, which may be substantially similar to actual account module 202, the virtual account module 204, and the linking module 206 described above with reference to FIG. 2. In further embodiments, the virtual account management module 104 includes one or more of a conversion module 302, an education module 304, a task module 306, a goal module 308, an allocation module 310, a payment module 312, an allowance module 314, and an interface module 316, which are described in more detail below.

The conversion module 302, in one embodiment, is configured to convert a virtual account to an actual user account. The conversion module 302 may convert a virtual account to an actual user account at the financial institution where the linked actual user account is located (e.g., at the same bank). In some embodiments, the conversion module 302 prompts the user to select a financial institution where an actual user account should be created for the user. For instance, the conversion module 302 may present a list of one or more financial institutions where the user has an account or financial institutions where the user does not have an account, or both, that the user can select from to create an actual user account at the selected financial institution. The conversion module 302 may communicate with an API or other interface for the financial institution where the virtual account is being converted to establish an account number or another identifier (which may be the same as the virtual account number) for the converted actual user account, the user's information for the converted actual user account, and/or the like.

In certain embodiments, if the virtual account has a balance, e.g., $300, that was "transferred" into it from a linked actual user account, the conversion module 302, upon creation of the actual user account for the virtual account, automatically transfers $300 from the linked actual user account to the newly created actual user account. If there is not enough money in the linked actual user account to transfer to the converted actual user account, the conversion module 302 may transfer the remaining balance in the actual user account (zeroing the balance of the actual user account); may transfer the full amount of the virtual account balance (causing the linked actual user account to be overdrawn), may prompt a user of the linked actual user account to deposit more funds into the linked actual user account prior to transferring the funds to the converted actual user account; and/or the like.

In certain embodiments, the conversion module 302 prompts the user associated with the actual user account that is linked to the virtual account for permission, consent, approval, or confirmation to convert the virtual account to an actual user account. For instance, the conversion module 302 may prompt a parent for confirmation to convert the parent's child's virtual account to an actual user account including transferring any funds that in the virtual account from the parent's actual user account to the converted actual user account for the child. When a virtual account is converted to an actual user account, in one embodiment, the subject matter below may still apply to the converted account such as the actual user account managing the converted account, presenting education material, providing tasks for compensation upon completion, and/or the like.

The education module 304, in one embodiment, is configured to present financial education material within an interface that is associated with the virtual account. The interface may include a webpage, a mobile application, a social media page, and/or the like. In certain embodiments, the education module 304 tracks how the virtual account user uses the virtual account, e.g., uses it to save money in one or more goals (described below), uses it to earn money by completing tasks (described below), uses it for purchases or other expenses and the types of purchases/expenses, and/or the like. In one embodiment, the education module 304 connects with financial education providers (e.g., Bonzai, Everfi, or the like) to embed financial simulations, contextual financial education modules, or the like within an interface associated with the virtual account.

Based on the usage of the virtual account, the education module 304 can dynamically select and present relevant financial education material. In one embodiment, the education material can include financial management videos, financial management articles, links financial management web sites, financial tips/recommendations/advice, financial offers, and/or the like. For example, if the user saves 2% of the money that is transferred to the virtual account in a savings goal, the education module 304 may provide tips, advice, forecasts, estimates, or other educational material to the user that is related to an amount being saved, how interest works, how much the user will have if he/she saves X % or a certain dollar amount every month, and so on. Similarly, the user may borrow money from the user of the linked actual user account as a loan with a predefined interest rate, and the education module 304 may present information about how to accelerate payoff of the loan, the overall cost of the loan (with interest), how loans work in the real world, how to refinance a loan, steps that the user can specifically take to help pay the loan off, budgeting hints/tips for paying the loan off, and/or the like.

In one embodiment, the task module 306 is configured to present a task, and a monetary value associated with completion of the task, within an interface associated with the virtual account (e.g., a mobile application, a website, or the like). The task, for instance, may include chores, homework, goals, and/or the like. Each task may have an associated monetary value, reward, points, or the like for completion of the task. The tasks may be created by a user associated with the actual user account and intended for a user associated with the virtual account.

For instance, a parent associated with an actual user account can create one or more chores for his child to complete, using the task module 306. The chores may include a description of the chore, a deadline for the chore, whether the chore is a recurring chore (e.g., every week, every two weeks, every month, or the like), or a one-time chore. and an amount of money that will be "transferred" from the parent's actual user account to the child's virtual account upon completion of the chore. When the child logs into his virtual account, e.g., via a mobile application or web site, the child may be presented with the chores so that the child can see which chores have been completed, which chores have yet to be completed, and which chores have a deadline that is passed. Upon completing a chore, the child can use the interface to select the chore that is complete. The task module 306 can notify the parent that the child marked the chore as complete and initiate the transfer of funds from the parent's actual user account to the child's virtual account (either manually or automatically).

In some embodiments, the task module 306 verifies that the task has been completed prior to providing the monetary value, reward, points, or the like to the virtual account. The task module 306, for instance, may provide a link for the virtual account user to upload an image or video of the completed task. The task module 306 may also provide a questionnaire, a survey, or the like that is related to the task and is intended for the user of the virtual account to fill out. The task module 306 may also receive comments/feedback from a user of the actual user account and/or the virtual account user. For instance, if a task was to clean the user's room (e.g., a child), the user of the actual user account (e.g., a parent) may comment to provide feedback on the how clean the user's room is and the user can also respond in the comments, and so on.

In some embodiments, the task module 306 receives a title, a description, and a monetary value/reward for a requested user-defined task from a user of the virtual account. For example, a child may define a chore to do with a description of the chore and a reward/payment/monetary value associated with completion of the chore. The task module 306 presents the user-defined task to the user associated with a linked actual user account for approval of the task. The user associated with the lined actual user account may approve the user-defined task, reject the user-defined task, or counter with a different task, a different task description, a different monetary value/reward for completion of the task, and/or the like. The virtual account user may accept the actual user account user's counter, define a new task, present a counter-offer, or the like, and so on.

Once the task module 306 receives approval of the user-defined task from the user of the actual user account, the task is listed as a task to be completed in the virtual account interface such that when the task is completed the monetary value/reward associated with the task is provided to the virtual account. In this manner, virtual account users can define their own tasks, e.g., children can define chores to do, which teaches virtual account users different ways in which to earn money by being a self-starter.

In one embodiment, the goal module 308 is configured to allocate at least a portion of a balance, a portion of an incoming transfer, or the like in the virtual account to one or more goals. As used herein, a goal is an aim or desired result, which, as it relates to the subject matter herein, may be a financial goal such as buying a vehicle, saving a certain amount of money, getting out of debt, or the like. The goals may be defined by the virtual account user or may be defined by the user of the actual user account for the virtual account user. In one embodiment, the amounts that are allocated to the one or more goals are deducted from an available balance for the virtual account. For example, a virtual account may have a $500 balance, but $100 may be allocated to a savings goal, and another $100 may be allocated to a vehicle goal (e.g., to purchase a vehicle) so that only $300 is available to spend.

In one embodiment, the goal module 308 may provide an interface for a child to link and/or otherwise associate one or more transactions to a goal (e.g., to indicate that the child has totally or partially "cashed out" their goal when making that purchase, or the like). For example, a child may save $200 for school clothes, and then when they go shopping, they may indicate, using an interface for the virtual account, that a transaction (e.g., this shoe transaction, this pants transaction, or the like), goes toward fulfilling and/or "cashing out" that goal.

In some embodiments, the goal module 308 creates fixed or permanent goals for the virtual account as defined by a user of the actual user account. For instance, a fixed goal may be that 5% of money transferred into the virtual account goes toward savings. In some embodiments, the goal module 308 receives funds from third parties that are intended for a specific goal for the virtual account user. For instance, extended family members may contribute directly to a virtual account user's goals, e.g., for the user's birthday, Christmas, or the like using various interfaces such as Venmo®, text, email, or the like.

In one embodiment, the allocation module 310 is configured to allocate, automatically, at least a portion of funds that are provided to the virtual account to one or more goals based on one or more rules that a user of the actual user account defines. For example, a parent who has his actual user account at a bank linked to his child's virtual account may establish allocation rules for funds that go into the virtual account such as 10% is allocated to savings, 10% is allocated to charity, 30% is allocated to a goal, and the rest is available for spending such that when funds are "deposited" or "transferred" into the virtual account, the allocation module 310 automatically allocates the funds accordingly.

The allocation module 310 may allow the virtual account user to reallocate or move funds between different goals. For example, a user may want to start saving more for college than for a car, which may necessitate changing how much money is allocated to the college fund versus the car fund. In certain embodiments, the allocation module 310 requests permission from the user of the actual user account prior to reallocating the amount of money that is allocated to different goals.

In one embodiment, the payment module 312 is configured to provide means for making payments from the virtual account using a balance in the virtual account. The payment means may include one or more of a physical spending card (e.g., a gift card, a debit card, a money card, or the like), a virtual spending card (e.g., a digital gift card, a digital credit card, or the like), a digital wallet (e.g., Apple Pay®, Google Wallet®, or the like), a mobile application (e.g., a mobile bank application that uses NFC to pay at point of sale terminals or kiosks), and/or the like.

In such an embodiment, when payment is processed from the virtual account, the payment module 312 transfers the funds from the actual user account that is linked to the virtual account, as described above. In such an embodiment, the payment module prompts a user of the actual user account, e.g., via a text message, push notification, email message, social media message, instant message, or the like, that is linked to the virtual account for confirmation, approval, or the like to process the payment from the virtual account prior to processing the payment from the virtual account, and consequently withdrawing funds from the actual user account. For example, if a child tries to purchase a video game using a digital credit card linked to the child's virtual account, the payment module 312 may prompt the parent whose actual user account is linked to the child's virtual account to confirm, verify, or approve the purchase. The parent may set other limitations on the spending card including locations where it can be used (physical and online locations), maximum amounts that can be spent (in one transaction, in one day, in a week, or the like), and/or the like.

Similarly, the payment module 312 may receive payments to the virtual account user via various means such as Venmo®, Paypal®, Zelle®, direct deposit, or the like. For example, a virtual account user may have a job babysitting and may receive payment for babysitting directly to the user's virtual account using Venmo®. In certain embodiments, an actual user account user such as a parent may establish "bills" for the virtual account user such as a child that are due regularly, e.g., monthly, such as a cell phone bill, an internet bill, or the like, which the virtual account user manually pays from the virtual account balance to the actual user account or the bill amount is automatically paid from the virtual account balance.

In one embodiment, the allowance module 314 is configured to transfer funds from an actual user account to a virtual account that is linked to the actual user account on a regular basis, e.g., every week or every two weeks. In certain embodiments, the allowance module 314 transfers funds from the actual user account to the linked virtual account during a regular transfer period (e.g., at the end of the week or the end of two weeks) in response to the user of the virtual account completing a threshold number of tasks/chores (as described above), based on the number of tasks/chores that the virtual account user completed during the transfer period, and/or the like.

For example, a parent who has the actual user account may specify that his/her child who has the virtual account can get paid an allowance every week (e.g., $20) for completing at least 80% of the child's tasks/chores. In another example embodiment, the parent may specify that the child gets paid for each task that is completed (e.g., $5 per task), which is then aggregated and transferred into the child's virtual account during a transfer period (e.g., at the end of a two-week period).

In one embodiment, the interface module 316 is configured to provide an interactive interface for the virtual account. The interactive interface may be a webpage, a mobile application interface, a social media interface, and/or the like. The interactive interface may include elements for providing hands-on experience with performing various tasks associated with management of the virtual account. For example, the interface may include interactive elements for assisting the user in saving money, establishing and allocating money to different goals, budgeting, and/or the like.

In certain embodiments, the interface module 316 is configured to dynamically change or adjust the settings, features, or the like of the interactive interface based on an age of the user of the virtual account. For instance, if the virtual account user is seven years old (e.g., younger than a predefined age threshold), the interface may include simple tasks for teaching the user how to earn money for doing chores, e.g., dragging an image of a dollar to an icon representing a chore that the child has completed to illustrate that the child received money for completing the chore, or dragging an image of a dollar to a piggy bank icon to illustrate saving money. Whereas, if the user is sixteen (e.g., older than a predefined age threshold), the interface may include more sophisticated features or settings such as allowing the user to apply for a loan through the user's parent's actual user account while explaining how interest works and what the total cost of the loan will be, displaying a history of the user's transactions and how long the user's budget will last, providing the user with different savings options that are appropriate for the user's age (e.g., saving for a car, saving for college, or the like), and/or the like.

Thus, the interface module 316 may present an interface that includes a different look, different functions (e.g., not relying on reading skills for younger groups, supporting different gesture interactions for different age groups, or the like), and/or one or more other differences based on the age of the user. For example, younger children may not be able to double-tap easily, but may be able to swipe, single-tap, or the like. Thus, the types of inputs/gestures that are used may be based on the age of the virtual account user, all within the same mobile application, website, and/or other interface. Similarly, the interface module 316 may read text or present more images to a five year old user (e.g., younger than a predefined age threshold). Gradually, over time, the interface module 316 may change and/or adjust the interface for a virtual account to provide more options, features, tools, or the like as the user ages and/or becomes a more sophisticated user of the interface.

In further embodiments, the interface module 316 dynamically changes or adjusts the settings or features of the interactive interface for the virtual account based on a usage history of the virtual account. For instance, the interface module 316 may determine that a ten year old user has been saving money regularly for the past six months and may present interface elements to further enhance the user's savings such as presenting the user with different savings options, different ways to allocate their money to savings, tactics to save more, or the like, which may not normally be presented to a ten year old. In certain embodiments, the user of the actual user account that is linked to the virtual account can set the parameters, settings, features, or the like of the interface for the virtual account. For example, a parent may enable/disable certain features of the interface based on the capabilities of the parent's child. In some embodiments, the interface module 316 prompts the parent about enabling/disabling certain features for the virtual account interface for their child (e.g., based on the child's usage history of the virtual account interface, or the like).

Figure 4:
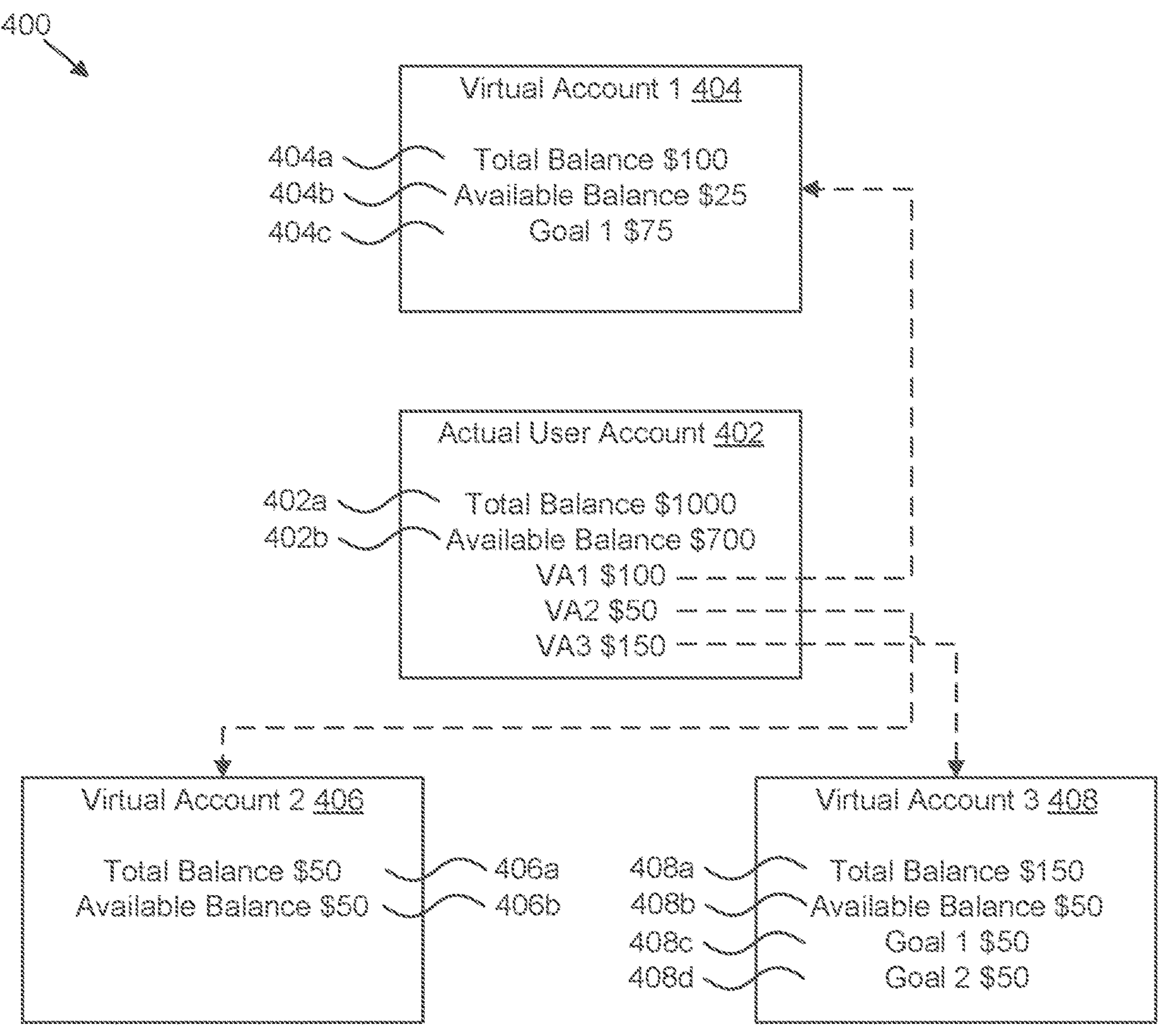
FIG. 4 is a schematic block diagram illustrating an example embodiment of virtual sub accounts.

FIG. 4 illustrates one embodiment of an actual user account 402 and plurality of virtual accounts 404-408 that are linked to the actual user account 402. The actual user account has a total balance 402*a* of $1000; however, only $700 of the total is available 402*b* because $300 dollars have been flagged or marked for virtual accounts 404-408. For instance, $100 has been transferred to virtual account 1 404, $50 has been transferred to virtual account 2 406, and $150 has been transferred to virtual account 3 408. Thus, even though those amounts have been transferred to and is recognized in virtual accounts 404-408, the money stays in the actual user account 402.

For virtual account 1 404, the total balance 404*a* is $100, but only $25 of it is available 404*b* for use because virtual account 1 has a goal account 404*c* set up that has $75 in it. Similarly, virtual account 3 408 has a total balance 408*a* of $150, $50 of which is available 408*b* because there are two goal accounts 408*c*-*d* set up that each have $50 in them. For virtual account 2 406, the total balance 406*a* is $50 and the available balance is $50 because no funds of the total balance 406*a* have been allocated elsewhere.

In certain embodiments, when transactions are made using a virtual account 404-408, any funds that are transferred for the transaction are made using the funds in the actual user account 402, but the changes in the amounts are realized in the virtual accounts 404-408. Furthermore, the user of the actual user account 402 may see the balances in each of the linked virtual accounts 404-408, including the goal balances and other information for each virtual account 404-408, e.g., tasks, transaction history, or the like.

Figure 5:
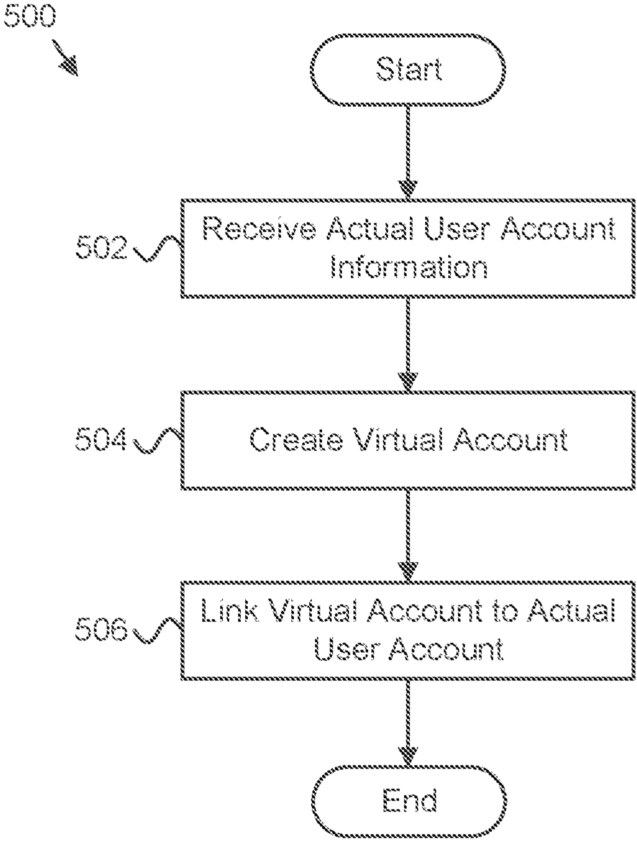
FIG. 5 is a schematic flow chart diagram illustrating one embodiment of a method for virtual subaccounts.

FIG. 5 depicts a schematic flow-chart diagram illustrating one embodiment of a method 500 for virtual subaccounts. In one embodiment, the method 500 begins and an actual account module 202 receives 502 information for an actual user account at a financial institution. In further embodiments, a virtual account module 204 creates 504 a virtual account, the virtual account comprising a simulated user account at the financial institution that is managed by an actual user account. In some embodiments, a linking module 206 links 506 the virtual account to the actual user account so that the actual user account manages the virtual account, and the method 500 ends.

Figure 6:
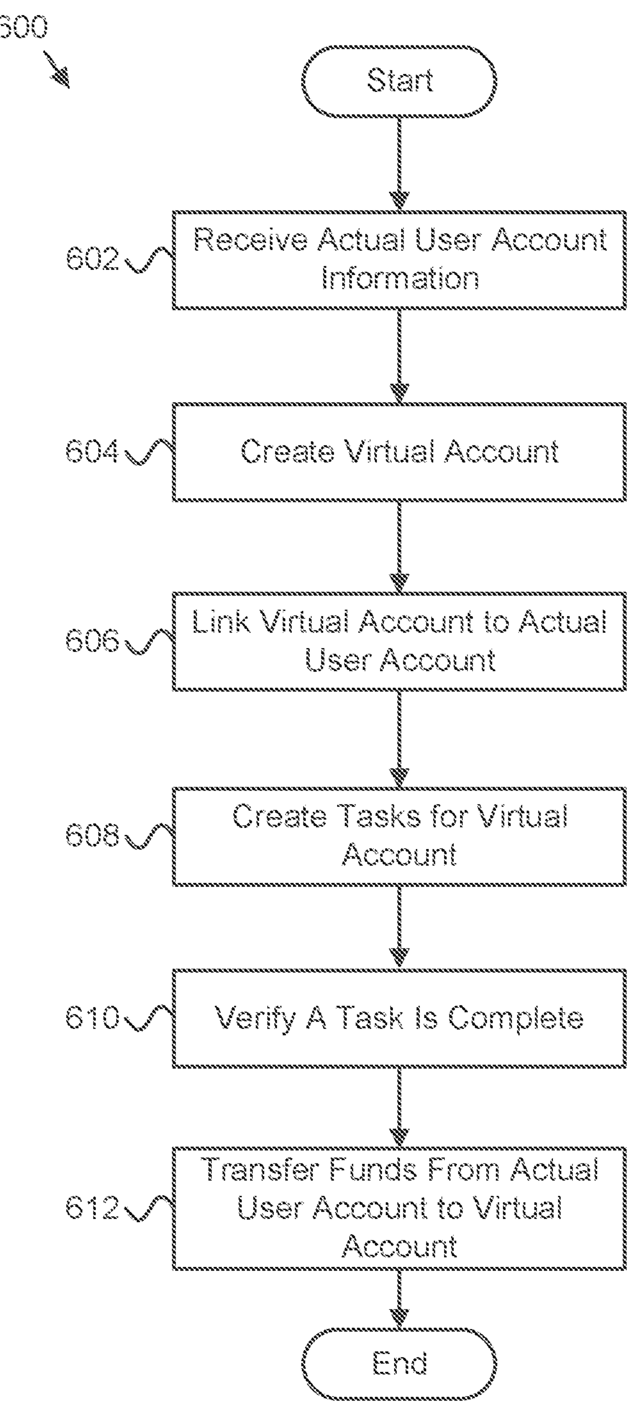
FIG. 6 is a schematic flow chart diagram illustrating a further embodiment of a method for virtual sub accounts.

FIG. 6 depicts a schematic flow-chart diagram illustrating one embodiment of a method 600 for virtual subaccounts. In one embodiment, the method 600 begins and an actual account module 202 receives 602 information for an actual user account at a financial institution. In further embodiments, a virtual account module 204 creates 604 a virtual account, the virtual account comprising a simulated user account at the financial institution that is managed by an actual user account. In some embodiments, a linking module 206 links 606 the virtual account to the actual user account so that the actual user account manages the virtual account.

In certain embodiments, the task module 306 creates 608 one or more tasks for the virtual account user. The tasks may include a task description and a monetary value for completing the task. The task module 306 verifies 610 that a task is complete, e.g., by requesting a photo of the completed task. The task module 306 transfers 612 funds from the actual user account to the virtual account in response to verifying that the task has been completed, and the method 600 ends.

Figure 7:
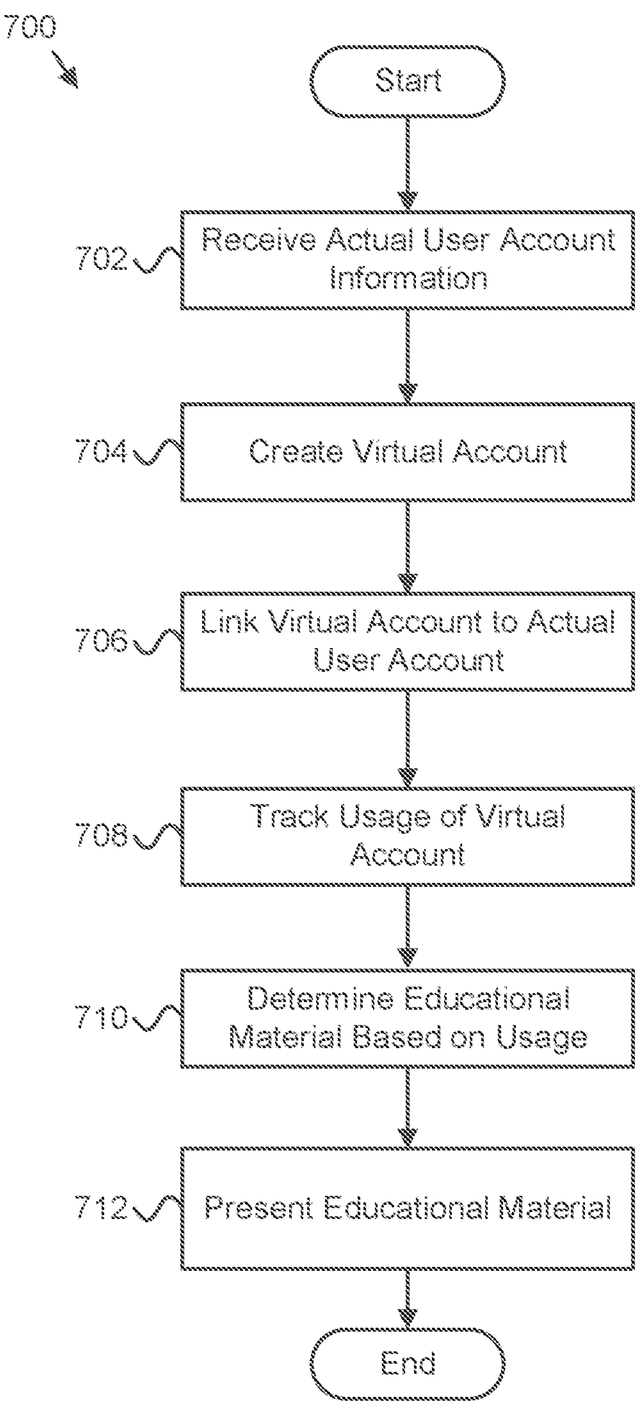
FIG. 7 is a schematic flow chart diagram illustrating another embodiment of a method for virtual subaccounts.

FIG. 7 depicts a schematic flow-chart diagram illustrating one embodiment of a method 700 for virtual subaccounts. In one embodiment, the method 700 begins and an actual account module 202 receives 702 information for an actual user account at a financial institution. In further embodiments, a virtual account module 204 creates 704 a virtual account, the virtual account comprising a simulated user account at the financial institution that is managed by an actual user account. In some embodiments, a linking module 206 links 706 the virtual account to the actual user account so that the actual user account manages the virtual account.

In one embodiment, an education module 304 tracks 708 a user's usage of the virtual account, including a transaction history, goal history, fund allocation history, or the like, determines 710 educational material to present to the user that is relevant to the user's usage of the virtual account (e.g., relevant financial management information), and presents 712 the education material to the user, and the method 700 ends.

A means for receiving information for an actual user account at a financial institution, in various embodiments, may include one or more of a hardware device 102, a backend server 110, an actual account module 202, a virtual account management module 104, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for receiving information for an actual user account at a financial institution.

A means for creating a virtual account, the virtual account comprising a simulated user account at the financial institution that is managed by an actual user account, in various embodiments, may include one or more of a hardware device 102, a backend server 110, a virtual account module 204, a virtual account management module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for creating a virtual account, the virtual account comprising a simulated user account at the financial institution that is managed by an actual user account.

A means for linking the virtual account to the actual user account so that the actual user account manages the virtual account, in various embodiments, may include one or more of a hardware device 102, a backend server 110, a linking module 206, a virtual account management module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for linking the virtual account to the actual user account so that the actual user account manages the virtual account.

Means for performing the other method steps described herein, in various embodiments, may include one or more of a hardware device 102, a backend server 110, an actual account module 202, a virtual account module 204, a linking module 206, a conversion module 302, an education module 304, a task module 306, a goal module 308, an allocation module 310, a payment module 312, an allowance module 314, and an interface module 316, a virtual account management module 104, a network interface, a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the method steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:

an actual account module that receives information for an actual user account at a financial institution;

a virtual account module that creates a virtual account, the virtual account comprising a simulated user account at the financial institution that is not an actual user account at the financial institution and does not maintain real funds, wherein the virtual account mimics functionality of the actual user account by executing simulated transactions that do not directly modify balances of the actual user account;

a linking module that programmatically interfaces with an application programming interface ("API") of the financial institution to link the virtual account to the actual user account and to one or more third-party accounts belonging to the actual user such that, in response to completion of a simulated transaction, a corresponding real transaction is completed using funds within the actual user account that have been flagged for use with the virtual account, the flagged funds being withheld from availability for other use until completion of the corresponding real transaction;

a verification module that evaluates each simulated transaction for compliance with one or more rules, available flagged funds, or configuration constraints prior to causing completion of the corresponding real transaction; and an interface module that:

presents a variable graphical user interface associated with the virtual account on a display of an electronic device, the graphical user interface comprising interactive interface elements for performing financial tasks associated with management of the virtual account, the interactive interface elements comprising input receiving interface elements adapted for an age of the user;

determines the user's age associated with the virtual account; and dynamically configure the variable graphical user interface based on the age of the user associated with the virtual account by:

exposing different interactive interface elements to a user within the graphical user interface based on the age of the user associated with the virtual account, the interactive interface elements allowing the user to perform various virtual tasks associated with the virtual account; and exposing different types of input that are allowed for the user for interacting with the interactive interface elements based on the age of the user associated with the virtual account, including enabling or restricting typed text, numeric entry, gesture input, and drag-and-drop input.

2. The apparatus of claim 1, further comprising a conversion module that converts the virtual account to an actual user account at the financial institution.

3. The apparatus of claim 1, wherein:

the actual user account comprises a monetary balance that is used to send and receive funds to/from the virtual account; and funds that are recognized in the virtual account remain in the actual user account balance but are not available to a user associated with the actual user account while the funds are recognized in the virtual account.

4. The apparatus of claim 1, further comprising an education module that presents financial education material within an interface associated with the virtual account.

5. The apparatus of claim 4, wherein the education module analyzes usage of the virtual account and dynamically selects financial education material to be presented that is relevant to the usage of the virtual account.

6. The apparatus of claim 1, further comprising a task module that:

presents a task within an interface associated with the virtual account, the task comprising a monetary value for completing the task; and provides the monetary value to the virtual account from the actual user account in response to the task being completed.

7. The apparatus of claim 6, wherein the task module further verifies that the task has been completed prior to providing the monetary value to the virtual account, the verification comprising an image of the completed task.

8. The apparatus of claim 6, wherein the task module further:

receives a user-defined task and an associated monetary value for completion of the user-defined task from a user associated with the virtual account; and receives approval of the user-defined task from a user associated with the actual user account such that the monetary value is provided to the virtual account from the actual user account in response to completion of the user-defined task.

9. The apparatus of claim 1, further comprising a goal module that allocates at least a portion of a balance in the virtual account to one or more goals, the portion of the balance allocated to the one or more goals deducted from an available balance for the virtual account.

10. The apparatus of claim 9, further comprising an allocation module that allocates at least a portion of funds that are provided to the virtual account to one or more goals based on one or more rules that a user of the actual user account defines.

11. The apparatus of claim 1, further comprising a payment module that allows making payments from the virtual account using a balance in the virtual account, funds for the payments deducted from the actual user account that is linked to the virtual account and actualized in the virtual account balance.

12. The apparatus of claim 11, wherein the payment module allows making payments from the virtual account by one or more of a physical spending card, a virtual spending card, a mobile payment, a digital wallet, and a mobile application.

13. The apparatus of claim 11, wherein the payment module further prompts a user of the actual user account for approval for a payment from the virtual account prior to processing a payment from the virtual account.

14. The apparatus of claim 1, further comprising an interface module that provides an interactive interface for the virtual account, the interactive interface comprising interactive interface elements for providing hands-on experience with performing various tasks associated with management of the virtual account.

15. A method, comprising:

receiving information for an actual user account at a financial institution;

creating a virtual account, the virtual account comprising a simulated user account at the financial institution that is not an actual user account at the financial institution and does not maintain real funds, wherein the virtual account mimics functionality of the actual user account by executing simulated transactions that do not directly modify balances of the actual user account; and programmatically interfacing with an application programming interface ("API") of the financial institution to link the virtual account to the actual user account and to one or more third-party accounts belonging to the actual user such that, in response to completion of a simulated transaction, a corresponding real transaction is completed using funds within the actual user account that have been flagged for use with the virtual account, the flagged funds being withheld from availability for other use until completion of the corresponding real transaction;

evaluating each simulated transaction for compliance with one or more rules, available flagged funds, or configuration constraints prior to causing completion of the corresponding real transaction;

presenting a variable graphical user interface associated with the virtual account on a display of an electronic device, the graphical user interface comprising interactive interface elements for performing financial tasks associated with management of the virtual account, the interactive interface elements comprising input receiving interface elements adapted for an age of the user;

determining the user's age associated with the virtual account; and dynamically configuring the variable graphical user interface based on the age of the user associated with the virtual account by:

exposing different interactive interface elements to a user within the graphical user interface based on the age of the user associated with the virtual account, the interactive interface elements allowing the user to perform various virtual tasks associated with the virtual account; and exposing different types of input that are allowed for the user for interacting with the interactive interface elements based on the age of the user associated with the virtual account, including enabling or restricting typed text, numeric entry, gesture input, and drag-and-drop input.

16. The method of claim 15, further comprising converting the virtual account to an actual user account at the financial institution.

17. The method of claim 15, further comprising:

presenting a task within an interface associated with the virtual account, the task comprising a monetary value for completing the task; and providing the monetary value to the virtual account from the actual user account in response to the task being completed.

18. The method of claim 15, further comprising allocating at least a portion of a balance in the virtual account to one or more goals, the portion of the balance allocated to the one or more goals deducted from an available balance for the virtual account.

19. A computer program product comprising a computer readable storage medium having program code embodied therein, the program code readable/executable by a processor for:

receiving information for an actual user account at a financial institution;

creating a virtual account, the virtual account comprising a simulated user account at the financial institution that is not an actual user account at the financial institution and does not maintain real funds, wherein the virtual account mimics functionality of the actual user account by executing simulated transactions that do not directly modify balances of the actual user account;

programmatically interfacing with an application programming interface ("API") of the financial institution to link the virtual account to the actual user account and to one or more third-party accounts belonging to the actual user such that, in response to completion of a simulated transaction, a corresponding real transaction is completed using funds within the actual user account that have been flagged for use with the virtual account, the flagged funds being withheld from availability for other use until completion of the corresponding real transaction;

evaluating each simulated transaction for compliance with one or more rules, available flagged funds, or configuration constraints prior to causing completion of the corresponding real transaction;

presenting a variable graphical user interface associated with the virtual account on a display of an electronic device, the graphical user interface comprising interactive interface elements for performing financial tasks associated with management of the virtual account, the interactive interface elements comprising input receiving interface elements adapted for an age of the user;

determining the user's age associated with the virtual account; and dynamically configuring the variable graphical user interface based on the age of the user associated with the virtual account by:

exposing different interactive interface elements to a user within the graphical user interface based on the age of the user associated with the virtual account, the interactive interface elements allowing the user to perform various virtual tasks associated with the virtual account; and exposing different types of input that are allowed for the user for interacting with the interactive interface elements based on the age of the user associated with the virtual account, including enabling or restricting typed text, numeric entry, gesture input, and drag-and-drop input.

20. The apparatus of claim 1, wherein the interface module further exposes the interactive interface elements to the virtual account user based on settings established by a user of the actual user account and disable one or more of the interactive interface elements exposed to the virtual account user.

* * * * *